US007567050B2

(12) United States Patent
Bellingroth

(10) Patent No.: US 7,567,050 B2
(45) Date of Patent: Jul. 28, 2009

(54) ARRANGEMENT FOR OPERATING AN ELECTRICALLY ADJUSTABLE ITEM OF FURNITURE FOR SITTING AND/OR LYING UPON

(75) Inventor: Klaus Bellingroth, Gummersbach (DE)

(73) Assignee: Okin Gesellschaft fur Antriebstechnik mbH, Gummersbach (DE)

( * ) Notice: Subject to any disclaimer, the term of this patent is extended or adjusted under 35 U.S.C. 154(b) by 259 days.

(21) Appl. No.: 10/571,304

(22) PCT Filed: Sep. 9, 2004

(86) PCT No.: PCT/DE2004/002019

§ 371 (c)(1),
(2), (4) Date: Nov. 6, 2006

(87) PCT Pub. No.: WO2005/025024

PCT Pub. Date: Mar. 17, 2005

(65) Prior Publication Data

US 2007/0195480 A1 Aug. 23, 2007

(30) Foreign Application Priority Data

Sep. 10, 2003 (DE) ................................ 103 41 705

(51) Int. Cl.
*G05B 5/00* (2006.01)
*G05D 3/00* (2006.01)
*H02H 7/08* (2006.01)
*H02P 1/04* (2006.01)
*H02P 3/00* (2006.01)
*H02P 7/00* (2006.01)

(52) U.S. Cl. .......................... 318/466; 361/38; 361/160

(58) Field of Classification Search ................. 318/466; 361/38, 160
See application file for complete search history.

(56) References Cited

U.S. PATENT DOCUMENTS

| | | | | |
|---|---|---|---|---|
| 3,917,929 | A * | 11/1975 | Reinhart | 701/99 |
| 5,528,449 | A * | 6/1996 | Koch | 361/160 |
| 7,126,806 | B2 * | 10/2006 | Farmont | 361/160 |
| 2008/0246422 | A1 * | 10/2008 | Fich et al. | 318/85 |

FOREIGN PATENT DOCUMENTS

| | | |
|---|---|---|
| EP | 1337023 | 8/2003 |
| WO | 9309634 | 5/1993 |
| WO | 0169745 | 9/2001 |

OTHER PUBLICATIONS

International Preliminary Report on Patentability with English translation dated Jul. 10, 2006 received in corresponding International Patent Application No. PCT/DE2004/002019 (10 pages).

* cited by examiner

*Primary Examiner*—Bentsu Ro
*Assistant Examiner*—Erick Glass
(74) *Attorney, Agent, or Firm*—Grossman Tucker Perreault & Pfleger, PLLC

(57) ABSTRACT

The invention relates to an arrangement for isolating supply current from control devices, which satisfies higher safety standards while, however, being easy to operate. To this end, the inventive arrangement comprises a device for isolating supply current from control devices that are connected to a first voltage source, which is connected to power mains and which serves to provide an operating potential for a servomotor.

12 Claims, 2 Drawing Sheets

ARRANGEMENT FOR OPERATING AN ELECTRICALLY ADJUSTABLE ITEM OF FURNITURE FOR SITTING AND/OR LYING UPON

FIELD

The invention relates to an arrangement for operating an electrically adjustable item of furniture for sitting and/or lying.

BACKGROUND

Modern furniture for sitting or lying upon can be equipped with electric positioning drives. An electric circuit for controlling the drives is, for example, described in generic European patent specification EP 0615667 B2. Using the arrangement disclosed there for isolating the supply current from control devices, isolation from the mains can be achieved, with simple technical means and without additional, manual switching operations, during those times at which no control functions are to be performed.

In the indicated prior-art arrangement for isolating the supply current, the operating voltage is applied to a servomotor via a relay, where the relay coil is connected to the operating potential via a push-button switch displaying a single switching contact. In addition, a further relay is provided, which is located in the mains lead to the transformer and is also actuated via the push-button switch indicated. This push-button switch is usually located on a hand-held control element, which is connected to the other elements of the electric circuitry arrangement via a cable. However, if a fault, such as a short-circuit, occurs in the cable or the push-button switch, for example, this can result in unwanted control functions being triggered. It is possible in such cases, for example, that servomotors are actuated without the user having operated the corresponding push-button switch. As a result, operating situations are possible that can also involve a certain hazard potential.

SUMMARY

The object of the invention is thus to provide an arrangement for operating an electrically adjustable item of furniture for sitting and/or lying upon with a device for isolating supply current from control devices that satisfies higher safety standards than conventional arrangements, but is easy to operate.

The invention solves this object with an arrangement for operating an electrically adjustable item of furniture for sitting and/or lying upon. In this context, the arrangement displays a device for isolating supply current from control devices that are connected to a first, mains-operated voltage source for providing an operating potential for a servomotor. A first relay is provided, which is located on the primary or secondary side of a mains transformer, where the relay is in an “off” position when in non-excited state. An auxiliary voltage source can be connected to the control input of the relay for releasing the power supply to the control device. The arrangement is characterised in that it contains a switching means displaying two, mutually independent switching contacts for simultaneous triggering of the switching processes, where the switching contacts can be actuated by one or two push-button switches. In this context, the first switching contact can be triggered to connect the auxiliary voltage source to the control input of the first relay, and the second switching contact to apply the operating potential to the servomotor. “Simultaneous triggering of the switching processes” means that the contacts are both triggered at a certain point in time in order to start the indicated actions, although it is perfectly possible for the two switching contacts to switch to the triggered state at different points in time. In any case, it must be ensured that the control devices are isolated from supply current when a control function is called up by the second switching contact.

The design of the arrangement according to the invention ensures that the occurrence of a single fault, particularly in the area of the hand-held control element for calling up control functions, does not trigger any unwanted functions. For example, a servomotor is not automatically and incorrectly activated in the event of a short-circuit in the first switching contact, which releases the supply current for the control devices. A short-circuit in the second switching contact also does not automatically lead to displacement of the motor, since the supply current for the control devices is not released as a result of the indicated fault as long as the first switching contact is not actuated. In addition, the design of the arrangement according to the invention is capable of ensuring that, despite maintaining first failure safety, both supply current isolation for the control devices and the triggering of functions by a hand-held control element are possible.

The invention is based on the idea of providing first failure safety for a control element by the relay for releasing the supply current for the control devices and the control functions for actuating the servomotor being triggered independently of each other by providing a switching means comprising two switching contacts for triggering the specified actions.

In order to avoid a no-load current in the mains transformer at times during which the arrangement is not in use, provision can be made for the device for isolating the supply current from control devices to be designed to isolate the control devices from the mains, where the first relay is spatially separated from the control devices and located on the primary side of the transformer. This design-related measure is capable of greatly reducing the hazard potential emanating from a transformer permanently connected to the mains in terms of fire or electric shock.

The hand-held control element can be linked to the remainder of the electrical arrangement either via an air interface or by wiring. In this context, a non-wired link can take the form of an infrared link or also a radio link.

In the event of a wired connection between the hand-held control element and the remaining circuitry of the arrangement, it is expedient if one input lead and one output lead are provided in the connecting cable for each of the two switching contacts of the switching means. Accordingly, a fault in the cable that affects only one or both of the leads of an individual switching contact also does not lead to a malfunction of the item of furniture for sitting and/or lying upon.

Even better fail-safety can be achieved if the necessary operating voltages are generated by using a mains transformer displaying at least two secondary windings for generating the first voltage source, for providing an operating potential for the motor, and for generating a second voltage source that can be connected to the control input of the first relay by means of the first switch. As a result of providing a voltage source for the control input of the first relay and a separate voltage source for providing the operating potential of the motor, the arrangement encompasses two essentially independent electric circuits, this providing a further improvement in the first failure safety of the arrangement according to the invention. For example, if a fault occurs in one of the two circuits, this generally has no influence on the other circuit, meaning that interference caused by the fault can essentially be ruled out. Both circuits are affected only if a fault occurs in the mains transformer that has an influence on both secondary windings of the transformer. In this respect, it is particularly advantageous if a separate transformer is provided for each of the two mains-operated voltage sources, both transformers being isolated from the mains by the first relay if the relay is in its "off" position, i.e. its normal position, and located on the primary side of the transformer.

It may be expedient to connect a capacitor in parallel with the two mains-operated voltage sources, formed by the transformer and a downstream rectifier, in order to smooth the voltage supplied by the rectifier. These capacitors can additionally have the function of an energy accumulator in order to provide operating functions, such as the closing of the first relay to apply the mains voltage to the transformer, even at times when the mains voltage is isolated from the arrangement. In order to be able to provide these operating functions even when the capacitors are discharged, e.g. due to their leakage currents, provision can be made for a battery to be connected in parallel with both the first and the second mains-operated voltage source via diodes.

To prevent the battery being unintentionally discharged via the servomotor, and thus performing an unwanted function, in the event of a fault occurring in the first switching contact, e.g. due to a short-circuit, provision can be made for a control input of a second relay to be connected in parallel or in series with the control input of the first relay, the second relay being located on the secondary side in the circuit of the first voltage source and, when in non-excited state, in an "off" position in which it isolates the parallel connection of the first mains-operated voltage source and the battery from the servomotor.

Depending on the embodiment, the control devices can be formed by several second switching contacts, which operate as motor function switches and pass the operating potential to the motor, either directly or via an additional relay. In this context, a first switching contact is assigned to each of the second switching contacts to form a switching means as referred to above. For example, it is possible that a single switch with a first switching contact is located in the control element, and one of the switches with a second switching contact has to be pressed in order to call up a control function for positioning a servomotor. However, it may also be that an associated first switching contact for each second switching contact is provided in the hand-held control element. In this case, all first switching contacts are arranged electrically in parallel.

In principle, the invention can be implemented using any kind of push-button switch. Not only mechanical push-button switches can be used, but also inductive or capacitive switches. However, mechanical switches should fundamentally be given preference in order to avoid malfunctions. Particularly favourable in ergonomic terms is the arrangement of a single switch with a first switching contact on one side of a hand-held control element, while the second switches with the second switching contact, which serve to operate the servomotor, can be located on the flat side of the hand-held control element. In this context, the term "hand-held control element" denotes a device which the user usually picks up in his hand to operate it.

To provide particularly easy operation of the two associated switching contacts forming a switching element, provision can be made for the switching means to comprise an actuator that, when operated, acts directly or indirectly on both the first and the second switching contact to trigger the two switching contacts. This design-related feature is particularly easy to apply in the case of mechanically triggerable switches. The switching means can be structured in such a way that, depending on the actuation of the switching means, one of the two switching contacts is triggered after a delay in relation to the other. This can result in circuitry-related advantages, in particular.

It can be expedient for the two switching contacts to be arranged in such a way in relation to each other that, when the one switching contact is actuated, it exerts a mechanical force on the second switching contact, with the result that the second switching contact is also triggered.

In a particularly advantageous embodiment requiring less space, the switching means is designed in the manner of a stack, displaying a mechanical actuator, a membrane switch deflectable in the direction of actuation with a switchable membrane contact and, located below the membrane, a pressure switch with a switchable contact provided with a plunger. The components located one above the other in the direction of actuation are mechanically connected to each other in such a way that, when the actuator is triggered, it presses on the switching membrane for triggering the switching membrane contact, as a result of which the switching membrane bends and presses against the plunger for triggering the pressure switch. If several of these switching means are provided in the hand-held control element for activating several motors, the first switching contacts for all switching means can be provided in the form of a switch pad, which provides a plurality of membrane switches in one plane. According to the invention, each membrane contact of the switch pad in this embodiment is assigned a mechanical actuator and a pressure switch in the direction of actuation to form the described switching means designed in the manner of a stack. These pressure switches each provide the second switching contact for the respective switching means.

A switching means with a very low failure rate is formed by a mechanical operating element that can be moved towards associated actuators of two push-button switches, arranged essentially next to each other, in order to trigger the two switches. In this context, both switches can be designed, for example, as pressure switches with a plunger, where the plungers are actuated by the mechanical operating element either simultaneously or one after the other, depending on design, as a result of which the switches can correspondingly be triggered at an interval or simultaneously.

In order to centrally suppress use of the hand-held control element for activating the servomotors provision can be made for the hand-held control element to include a locking switch, e.g. in the form of a key-operated switch, connected in series with all first switches. Despite actuation of one of the first switching contacts and the associated second switching contact, this locking switch prevents the application of a voltage to the control input of the first relay, and thus the generation of an operating voltage for the servomotor(s).

BRIEF DESCRIPTION OF THE DRAWINGS

The invention is described below in reference to the enclosed drawings. The Figures show the following.

DETAILED DESCRIPTION

Figure 1:
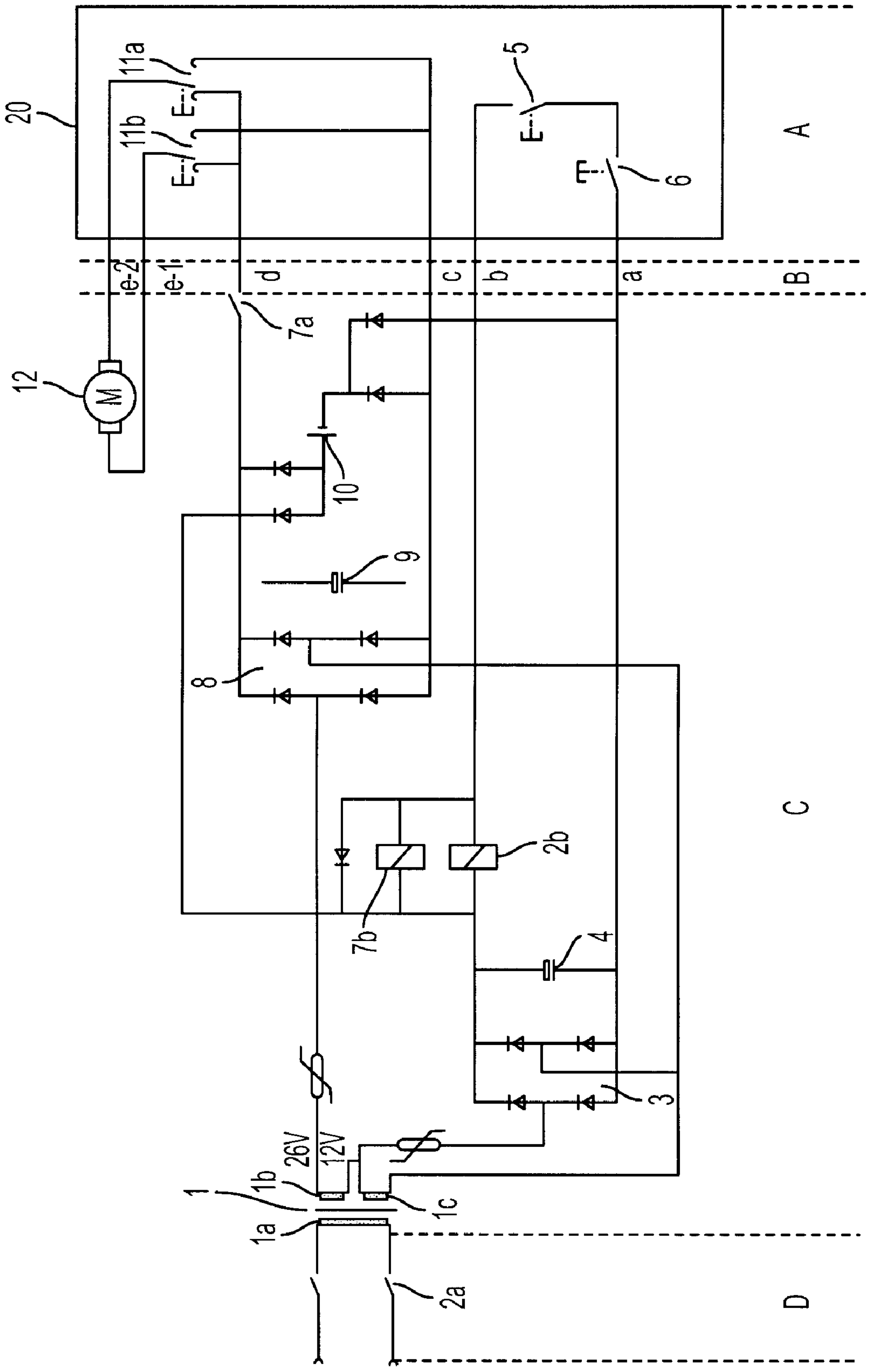
FIG. 1 A schematic diagram indicating the structure of an arrangement according to the invention for operating an electrically adjustable item of furniture for sitting and/or lying upon, and FIG. 2 An embodiment of a switching means for the arrangement illustrated in FIG. 1.

FIG. 1 shows an arrangement according to the invention for operating an electrically adjustable item of furniture for sitting and/or lying upon in a schematic diagram. To more clearly illustrate the real structure, the circuit is divided into four sections, A to D.

A relates to the hand-held control element, which is connected, via a cable in section B, to the rest of the circuitry arrangement C. Section D denotes the part of the primary-side connection of the transformer to the mains, essentially displaying the mains lead, i.e. a mains cable and relay 2 *a*. In detail, the arrangement comprises a transformer 1 with a primary winding 1 *a* and two secondary windings 1 *b*, 1 *c*, which serve to generate two mains-operated voltage sources. The first is obtained by tapping the series connection of the secondary windings and feeding the transformed mains voltage to a rectifier 8, whose output has a storage capacitor 9 connected in parallel. The second mains-operated voltage source is generated by tapping the transformed mains voltage from one of the secondary windings and feeding it to a rectifier 3, whose output again has a storage capacitor 4 connected in parallel. The electric circuits running from the two mains-operated voltage sources are independent of each other. The circuit assigned to storage capacitor 4 runs via a control coil 2 *b* of a two-pole relay, where the relay is located on the primary side in the mains lead of transformer 1. The circuit runs to hand-held control element 20 via a push-button switch 5, operating as a first switching contact, and a key-operated switch 6, back to the negative pole of storage capacitor 4.

Furthermore, a battery 10 is arranged parallel to storage capacitor 4 via diodes, which together form an auxiliary voltage source for actuating relay 2 *a* when the arrangement is not connected to the mains, i.e. when relay 2 *a* is in its "off" state, because the associated control coil 2 *b* is not excited.

It should, however, be pointed out that use of the battery is not absolutely necessary for operation of the arrangement according to the invention. In the present instance, control coil 2 *b* of two-pole relay 2 *a* is assigned a further, parallel control coil 7 *b* of a single-pole relay 7 *a*, which makes the circuit in response to excitation of control coil 7 *b*. This means that relay contact 7 *a* is open when the associated control coil 7 *b* is not excited.

As can be seen from the drawing, battery 10 is also connected in parallel, via diodes, to storage capacitor 9 of the other mains-operated voltage source. Located in the circuit of this voltage source is a servomotor 11, which can be supplied with the operating voltage for activating the motor via second switches 11 *a*, 11 *b* with a second switching contact. In the example illustrated, switches 11 *b* and 11 *a* are designed and arranged in such a way that, when in "off" position, they connect both connections of motor 12 to the positive potential of storage capacitor 9. As can be seen from the Figure, switches 11 *a*, 11 *b* have two switch positions, by means of which the respective motor connection can be connected either to the positive potential or to the negative potential of the voltage source provided by rectifier 8. Accordingly, one switch is used for forward movement of motor 12, and the other switch for reverse movement. If both switches 11 *a*, 11 *b* are pressed, both motor connections are connected to the negative potential of the voltage source. Both first switch 5 with the first switching contact and also switches 11 *a*, 11 *b* with the second switching contact are designed as mechanical push-button switches.

The mode of operation of the arrangement illustrated in FIG. 1 is described below. It will be assumed in this context that key-operated switch 6 is closed. Since first relay 2 *a* is open when control coil 2 *b* is not excited, no mains current initially flows to the transformer. Consequently, the voltages present at storage capacitors 4, 9 are dependent on previous operation. Since the battery is connected in parallel with the two storage capacitors, it is, however, ensured that the battery voltage is present at capacitors 4, 9 as a minimum. If, in this situation, a fault in one of switches 11 *a*, 11 *b* has the effect that operation of a push-button is triggered, of if such operation is performed unintentionally, open relay 7 *a* prevents execution of the corresponding control function assigned to the respective push-button. This prevents servomotor 11 from being activated as the result of a fault, e.g. by a short-circuit in a contact.

If, in contrast, no mains power is present at the transformer and switch 5 is operated, both control coil 2 *b* and control coil 7 *b* can be excited owing to the battery voltage supplied to capacitor 4. Switching of two-pole relay 2 *a* has no effect, whereas single-pole relay 7 *a* assumes an "on" state, as a result of which the battery voltage, or the voltage at storage capacitor 9, is applied to the contacts of the second switches in the hand-held control element. Consequently, a positioning movement of the motor can be triggered in the event of simultaneous operation of first switch 5, with the first switching contact, and one of the two switches 11 *a*, 11 *b* with the second switching contact.

If, however, mains voltage is applied to the connections of the two-pole relay, operation of switch 5 excites control coil 2 *b*, thereby switching the two-pole relay, as a result of which mains voltage is applied to the primary side of the transformer. As described, relay 7 *a* also switches at the same time. After smoothing, the voltage supplied by rectifier 8 is applied to capacitor 9, meaning that the operating voltage for activating servomotor 11 is applied to the input-side contacts in the hand-held control element. Operation of one of the two function-triggering switches 11 *a*, 11 *b* activates servomotor 11. The voltage of battery 10 is selected in such a way that it is lower than that of the mains-operated voltage source that can be tapped at the output of rectifier 8. The result of this is that the respective operating potential is not provided through battery 10 during normal operation of the servomotors. Rather, the battery only provides the operating potential for controlling highly specific functions if the mains voltage fails. This relates to lowering the piece of furniture to a home position, for example. In contrast, the battery voltage relative to the other mains-operated voltage source is set to a similar value, 9 V in this instance, so that it can be ensured under all circumstances that a sufficiently high voltage is available at all times for exciting control coils 2 *b* and 7 *b* via switch 5.

The design according to the invention of the arrangement shown in FIG. 1 provides great first failure safety. As illustrated, the cable present in section B comprises six leads, a, b, c, d, e1 and e2, which are assigned to the two circuits or to the supply of operating voltage to the motor. A cable break with a short-circuit in one of the two circuits does not lead to unintentional triggering of functions, i.e. operation of servomotor 11. Similarly, a single fault in the hand-held control element, such as a short-circuit in switch 5 with the first switching contact, or in one of the second switches 11 *a*, 11 *b* with the second switching contact, does not lead to unintentional triggering of functions.

The specific arrangement of the associated switches in the control element varies, depending on the embodiment. In a first embodiment, switch 5 is spatially separated from function-triggering switches 11 *a*, 11 *b*. As mentioned, both switch 5 with the first switching contact, and also second switch 11 *a* or 11 *b* with the second switching contact, must be pressed in order to trigger a defined function.

In a further embodiment of the invention, provision is made, in the hand-held control element, for a switching means that encompasses both the first and the second switching contact, in which context the two switching contacts are triggered consecutively by pressing a single, mechanical actuator. A switching means 30 of this kind is illustrated schematically in FIG. 2. Switching means 30 displays several elements, arranged one above the other in the direction of actuation. These elements are a mechanical actuator 31, a membrane switch deflectable in the direction of actuation, and a pressure switch, also located below the membrane in the direction of actuation. In this context, the membrane switch is of single-pole design (see switch 5 in FIG. 1), and pressure switch 33 is a two-way switch (see switch 11 *a* or 11 *b* in FIG. 1). Accordingly, the membrane switch displays two contact studs 32 *a* and 32 *b*, while the pressure switch located beneath possesses three connecting contacts. Upon manual operation of actuator 31, it presses against membrane switch 32 in such a way that the two contact studs 32 *a* and 32 *b* make contact. The actuating travel of operating element 31 is set in such a way that, when the actuator is pressed farther, it moves the membrane contact towards a plunger 34 of pressure switch 33 until the bottom surface of membrane switch 32 is ultimately moved up against the plunger, as a result of which switch 33 is triggered. As already explained, a fault in one of the two switches, such as a short-circuit in the membrane switch, cannot trigger any unwanted control function for activating motor 11.

Figure 2:
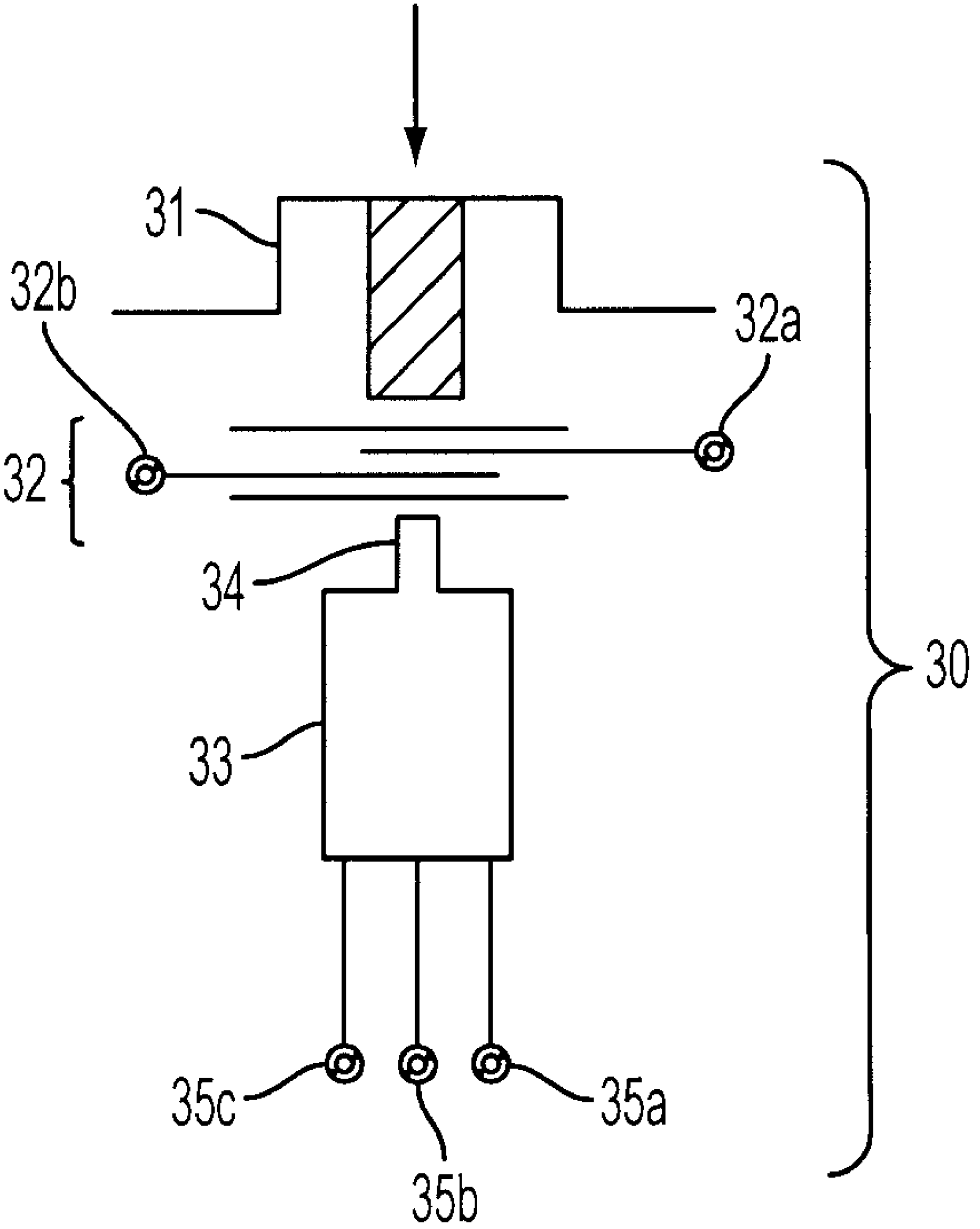

As is evident to a person skilled in the art, the switching means illustrated in FIG. 2 is eminently suitable for forming a corresponding matrix of switching means, by means of which several motors can be activated in the manner indicated. In this context, all first contacts, i.e. switches 32 in the matrix of switching means, are connected in parallel. Switch 32 in FIG. 2 corresponds to switch 5 in FIG. 1 here. In this matrix of switching means (not shown) for activating several motors, switches 33 of the matrix of switching means assigned to these motors are connected in parallel on the input side, such that all the respective change-over contacts are connected to the positive pole of storage capacitor 9, or to its negative pole, meaning that each motor is connected to the operating potential as a result of operation of the associated switch 33 and simultaneous operation of membrane switch 32.

In an embodiment of the invention not shown, the first relay is located not on the primary side of the mains transformer, but on the secondary side, as a result of which the control devices are isolated from the supply current when it is in its "off" position. Again, a short-circuit in one of the second switching contacts does not then lead to erroneous application of the operating potential to the associated servomotor, since the second switching contact is isolated as a result of the "off" position of the first relay. In the embodiment shown in FIG. 1, the first relay can, if arranged on the secondary side, be located in the connection between rectifier 8 and the secondary side of transformer 1. However, it is also possible for the first relay to be of multi-pole design, isolating both first rectifier 8 and second rectifier 3 from the transformer when in its "off." position.

LIST OF REFERENCE NUMBERS

1 Transformer
1 *a* Primary winding
1 *b, c* Secondary windings
2 *a* Two-pole relay
2 *b* Control coil of the two-pole relay
3 Rectifier
4 Storage capacitor
5 Switch with first switching contact
6 Key-operated switch
7 *a* Single-pole relay
7 *b* Control coil of the single-pole relay
8 Rectifier
9 Storage capacitor
10 Battery
11 *a, b* Switches with second switching contact
12 Motor
20 Hand-held control element
30 Switching means
31 Operating element, actuator
32 Membrane switch
32 *a* Membrane contact stud
32 *b* Membrane contact stud
33 Pressure switch
34 Plunger
35 *a,b,c* Pressure-switch contact lug

What is claimed is:

1. Arrangement for operating an electrically adjustable item of furniture for sitting and/or lying upon, with a device for isolating supply current from control devices that are connected to a first mains-operated voltage source for providing an operating potential for a servomotor, and with a first relay, which is located on the primary side of a mains transformer and in an "off"position when in non-excited state, and with an auxiliary voltage source that can be connected to the control input of the first relay, wherein a switching means with two, mutually independent switching contacts for simultaneous triggering of two switching processes, where the switching contacts can be actuated by one or two push-button switches and a first switching contact can be triggered to connect the auxiliary voltage source to the control input of the first relay, and a second switching contact to apply the operating potential to the servomotor and wherein the mains transformer comprises at least two secondary windings for generating the first mains-operated voltage source and a second mains-operated voltage source, connected to a control input of the first relay via a switch.

2. Arrangement according to claim 1, wherein the device for isolating the supply current from control devices isolates the control devices from the mains, and the first relay is separated from the control devices and located on the mains side.

3. Arrangement according to claim 1, wherein the switching means is integrated in a hand-held control element and connected to the remaining circuitry of the arrangement via a cable, where at least one input lead and one output lead are provided in the cable for each of the two switching contacts.

4. Arrangement according to claim 1, wherein a capacitor is connected in parallel with each of said two voltage sources.

5. Arrangement according to claim 1, wherein a battery is connected in parallel with both the first and the second mains-operated voltage source via diodes.

6. Arrangement according to claim 1, wherein a control input of a second relay is connected in parallel or in series with the control input of the first relay, where the second relay is spatially separated from the control devices, located on the secondary side and, when in non-excited state, in an "off"position in which it isolates the parallel connection of the first mains-operated voltage source and the battery from the servomotor.

7. Arrangement according to claim 1, wherein the control devices are formed by several switches, which operate as motor function switches and each have the second switching contact, a switch with the first switching contact being assigned to each of them to form a switching means.

8. Arrangement according to claim 1, wherein the switching means comprises an actuator that, when operated, acts directly or indirectly on both the first and the second switching contact to trigger the contacts.

9. Arrangement according to claim 8, wherein the second switching contact is triggered after the first switching contact.

10. Arrangement according to claim 8, wherein the switching means is a stack that displays, located one above the other in the direction of actuation, the actuator, a membrane switch deflectable in the direction of actuation with a switchable membrane contact and, located below the membrane, a switch with a switchable contact provided with a plunger, these being mechanically connected to each other in such a way that, when the actuator is triggered, it presses on the switching membrane for triggering the switching membrane contact, as a result of which the switching membrane bends and presses against the plunger for triggering the switch.

11. Arrangement according to claim 8, wherein the switching means displays a mechanical operating element that can be moved with a plunger towards associated actuators of two switching contacts, arranged next to each other, in order to trigger the two switching contacts.

12. Arrangement according to claim 1, wherein the handheld control element includes a locking switch, connected electrically in series with the first switching contact.

* * * * *